Patented Jan. 29, 1929.

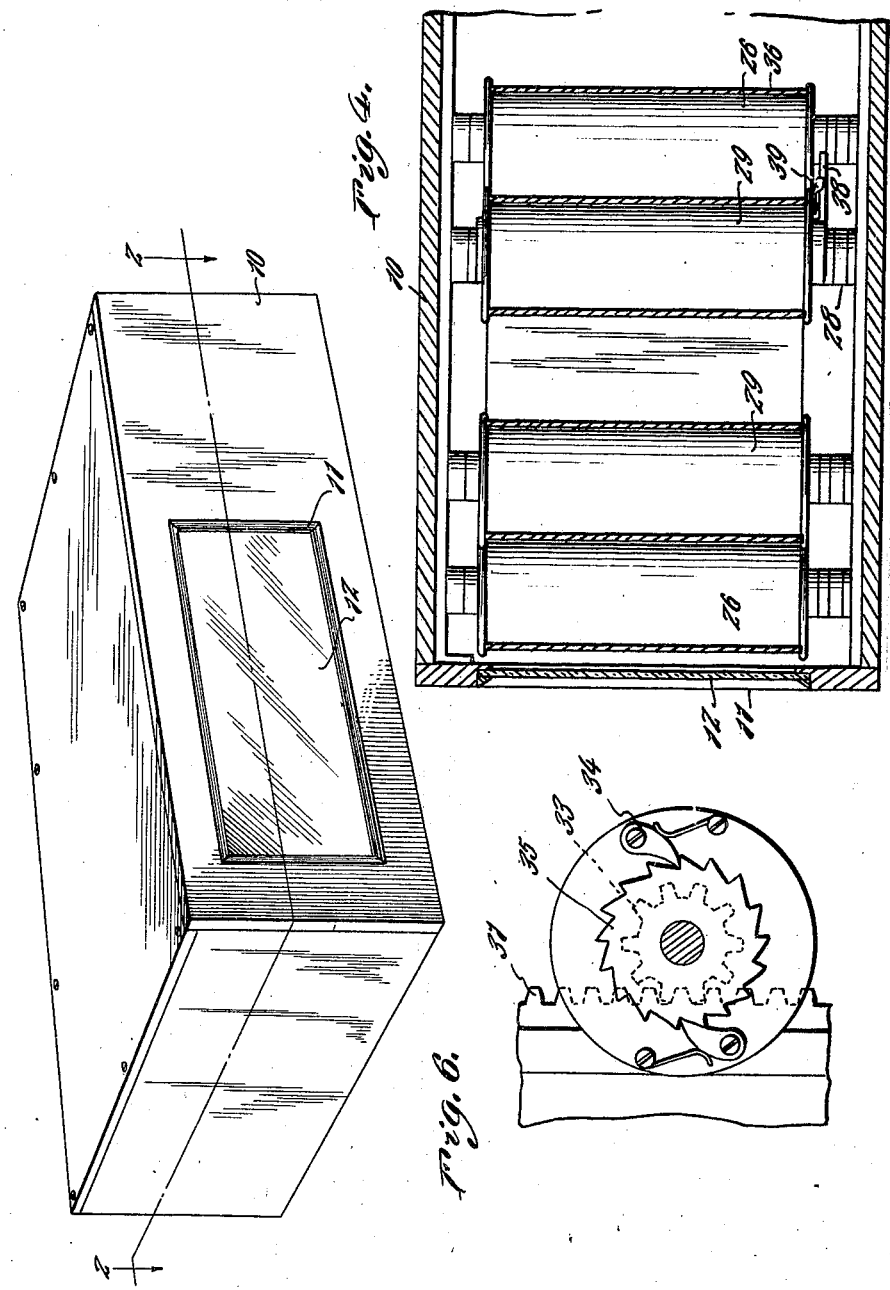

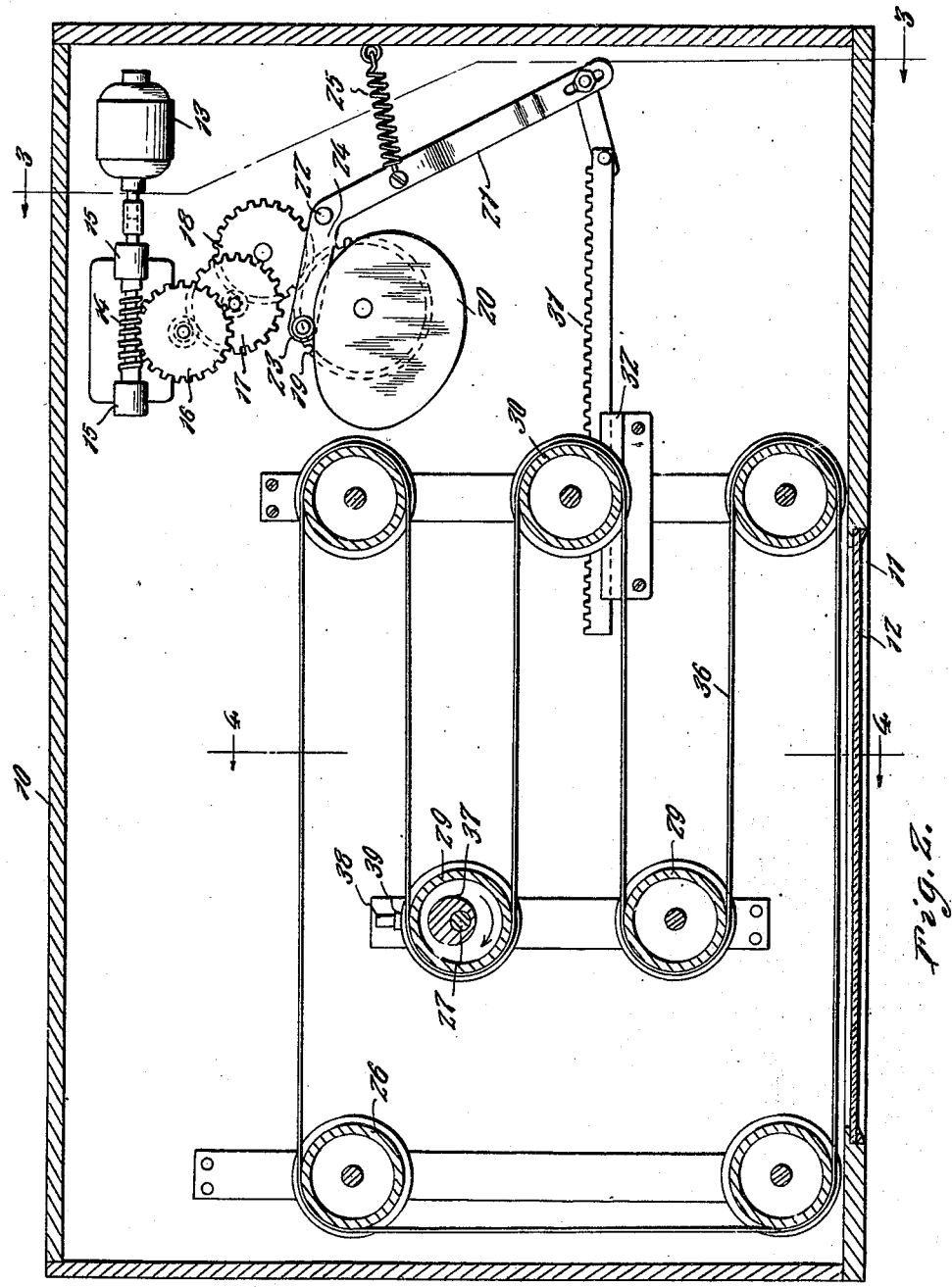

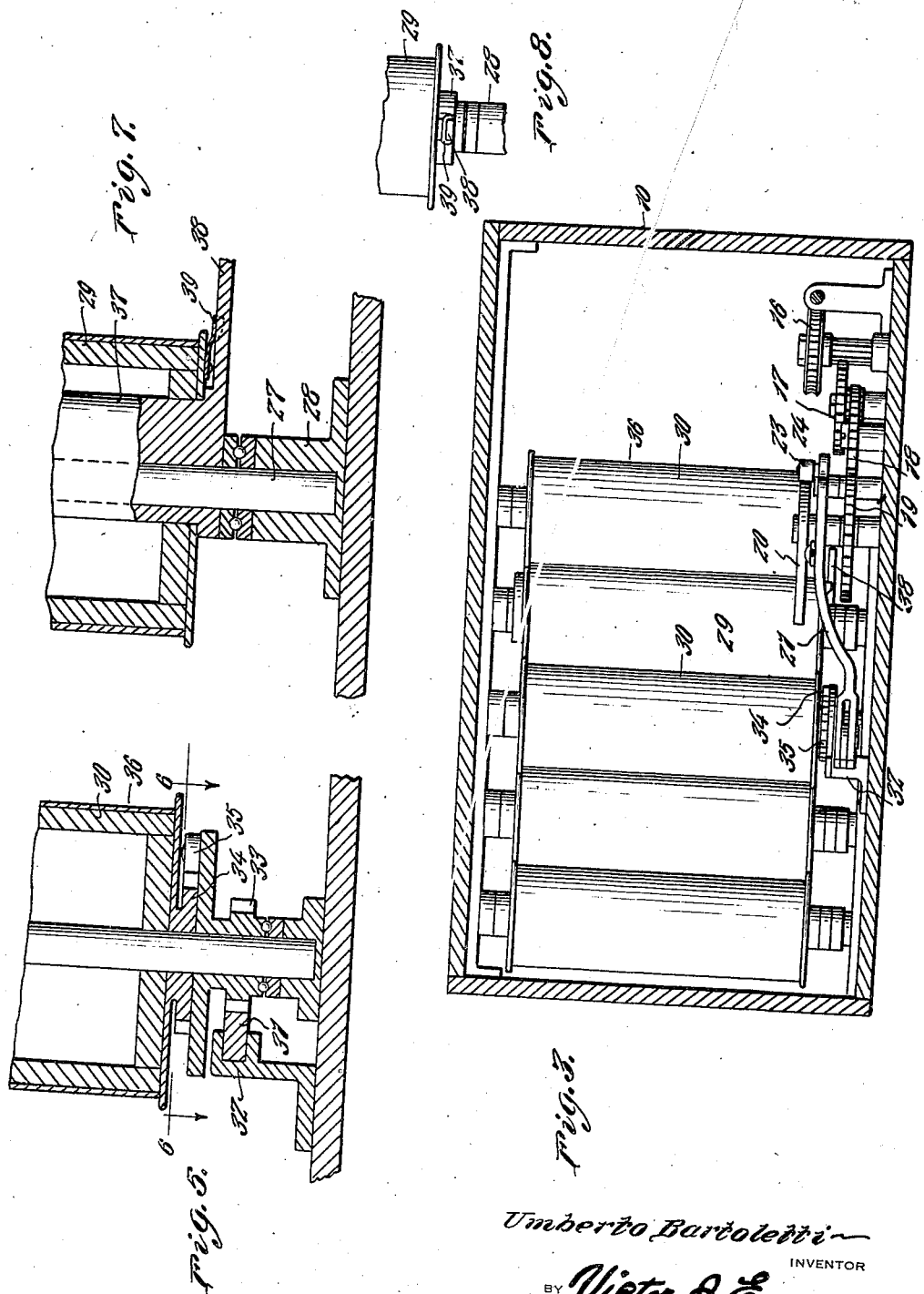

1,700,622

UNITED STATES PATENT OFFICE.

UMBERTO BARTOLETTI, OF NEW YORK, N. Y.

ADVERTISING DEVICE.

Application filed February 15, 1928. Serial No. 254,508.

This invention relates to advertising devices embodying among other characteristics a housing member provided with a sight opening through which the advertising matter may be viewed.

Another object of the invention comprehends an endless belt carried within the housing and bearing advertising matter upon the face thereof exposed through the sight opening.

An additional object of the invention contemplates a multiplicity of roller members adapted to carry the belt whereby the latter will be caused to travel over a continuous course.

More specifically stated, the device is provided with an operating mechanism adapted to rotate the roller members at intervals in order that the advertising matter may be displayed between said intervals.

With the above and other objects in view, the invention further consists of the following novel features and details of construction, to be hereinafter more fully described, illustrated in the accompanying drawings and pointed out in the appended claims.

In the drawings:—

Figure 1 is a perspective view of the housing for my invention having a sight opening.

Figure 2 is a sectional view taken on line 2—2 of Figure 1.

Figure 3 is a sectional view taken on line 3—3 of Figure 2.

Figure 4 is a sectional view taken on line 4—4 of Figure 2.

Figure 5 is a fragmentary detail view of the mounting and construction of the power roller.

Figure 6 is a sectional view taken on line 6—6 of Figure 5.

Figure 7 is a view similar to that of Figure 5 illustrating a cam arrangement for tightening and loosening the endless belt upon the rollers.

Figure 8 is a detail view of the locking means for the cam upon the roller.

Referring to the drawings in detail, wherein like characters of reference denote corresponding parts, the reference character 10 indicates a housing having an opening 11 in one side and supporting a transparent panel therein through which the contents of the housing may be viewed. A motor 13, carried within the housing and adapted for connection with a worm 14 mounted between bearings 15, is adapted for meshing engagement with a worm gear 16. The worm gear 16 operates a train of gears 17, 18, and 19. The latter mentioned gear carries a cam member 20, the purpose of which will be presently apparent. A lever 21, pivotally mounted as indicated at 22 within the housing 10, is provided with a roller member 23 within one end of an obliquently disposed extremity 24. Said roller is adapted to engage the outer surface of the cam member 20 and is held in such position by a retractile spring 25 having connection with the lever 21. A multiplicity of roller members 26, having the ends of their trunnions 27 journaled within bearings 28, are arranged in pairs at either end of the sight opening 11, covered by the transparent panel 12. Intermediate rollers 29, being arranged between the aforementioned pairs of roller members 26. A power roller member 30 being disposed between the pair of roller members 26 adjacent the lever 21.

A rack bar 31, operable by the lever 21 and within a guide 32, located adjacent one end of the power roller 30, is adapted for meshing engagement with a pinion 33, carried by the power roller 30 and adapted to impart rotation thereto in one direction. Due to the fact that the rack bar is mounted for oscillatory movement, I have provided a pawl and ratchet connection 34 and 35 adapted for connection with the pinion 33 and roller 30 to check retrograde movement of the roller member and permit the rack bar to be retracted in position for a successive power stroke.

An endless belt 36 is trained or wound over and around the roller members 26, 29 and 30, in the manner as best illustrated in Figure 2 of the drawings.

As mentioned in the foregoing, one of the roller members is to be provided with a cam arrangement for tightening and loosening the belt or belts in the event other belts are substituted to display other advertising matter. The cam arrangement is in the nature of a cylindrical member 37, eccentrically mounted upon one of the trunnions 27 of the intermediate rollers 29. A lever 38, projected outwardly from the lowermost end of the cylindrical member 37 and when shifted in the direction of the arrow, as illustrated in Figure 2 of the drawing, will slacken or loosen the belt upon the roller member. This lever is only actuated when it is desired to remove and replace a belt upon the roller members.

A catch device 39, carried by the lever 38, is adapted for locking engagement with the particular intermediate roller 29 to hold the cylindrical member 37 in its respective positions.

Either a shutter or flash illumination feature may be employed for use in conjunction with the invention during the rotation of the belt 36 to move another of the ads. in position directly behind the transparent panel 12.

The invention is susceptible of various changes in its form, proportions and minor details of construction and the right is herein reserved to make such changes as properly fall within the scope of the appended claims.

Having described the invention, what is claimed is:—

1. An advertising device comprising a housing having a sight opening closed by a transparent panel, roller members operable within the housing, an endless belt carried by the roller members being adapted to expose advertising matter carried upon the outer face of the belt through the transparent panel, an operating mechanism adapted for connection with a roller member to cause the endless belt to be moved past the transparent panel, a pawl and ratchet connection carried by one of the roller members having connection with the operating means being adapted to stop the belt between exhibitions of the advertising surfaces thereof, and an eccentric carried upon one of the roller members adapted to loosen and tighten the belt to permit easy exchange of belts.

2. An advertising device comprising a housing having a sight opening closed by a transparent panel, roller members operable within the housing, an endless belt carried by the roller members being adapted to expose advertising matter carried upon the outer face of the belt through the transparent panel, an operating mechanism adapted for connection with roller members to cause the endless belt to be moved past the transparent panel, a pawl and ratchet connection carried by one of the roller members having connection with the operating means and adapted to stop the belt between exhibitions of the advertising surfaces thereof, an eccentric carried upon one of the roller members adapted to loosen and tighten the belt to permit easy exchange of belts, and a cam member operatively connected with the pawl and ratchet connection to stop rotation of the roller members between exhibitions of the advertising matter upon the belt.

In testimony whereof I affix my signature.

BARTOLETTI, UMBERTO.